United States Patent [19]

Springer

[11] 4,237,050
[45] Dec. 2, 1980

[54] PROCESS FOR THE PREPARATION OF WATER-SOLUBLE PHTHALOCYANINE DYESTUFFS

[75] Inventor: Hartmut Springer, Königstein, Fed. Rep. of Germany

[73] Assignee: Hoechst Aktiengesellschaft, Frankfurt am Main, Fed. Rep. of Germany

[21] Appl. No.: 44,158

[22] Filed: May 31, 1979

[30] Foreign Application Priority Data

Jun. 2, 1978 [DE] Fed. Rep. of Germany ....... 2824211
Feb. 20, 1979 [DE] Fed. Rep. of Germany ....... 2906442

[51] Int. Cl.$^3$ ............................................. C09B 47/08
[52] U.S. Cl. ............................ 260/242.2; 260/245.1; 260/314.5
[58] Field of Search ................ 260/314.5, 242.2, 245.1

[56] References Cited
U.S. PATENT DOCUMENTS 3,899,486   8/1975   Horst ................................. 260/314.5

*Primary Examiner*—Richard Raymond
*Attorney, Agent, or Firm*—Curtis, Morris & Safford

[57] ABSTRACT

A process for the preparation of water-soluble phthalocyanine dyestuffs containing a fiber-reactive group of the vinylsulfone series, by reacting phthalocyanine sulfochlorides, optionally containing sulfo groups, with a primary or secondary amine which contains a fiber-reactive group of the vinylsulfone series, and optionally with a further primary or secondary amine in common manner, wherein according to the invention a pyridine-sulfonic acid or a pyridine-carboxylic acid is used as catalyst instead of the pyridine, as used previously. The use of pyridine-sulfonic acids or pyridine-carboxylic acids—which results in the same good reaction rate and yield as the use of pyridine in the preparation of phthalocyanine dyestuffs—avoids the considerable drawbacks occurring in the preparation on an industrial scale, which drawbacks are caused by the toxic properties and the unpleasant smell of the pyridine.

12 Claims, No Drawings

PROCESS FOR THE PREPARATION OF WATER-SOLUBLE PHTHALOCYANINE DYESTUFFS

The present invention relates to a process for the preparation of water-soluble phthalocyanine dyestuffs.

A great number of known water-soluble phthalocyanine dyestuffs are prepared by reacting phthalocyanine sulfochlorides with water-soluble aromatic amines in an aqueous medium and adding as catalysts tertiary amines, especially pyridine, in order to make the formation of sulfonamides possible and/or to accelerate the same. This addition of a tertiary amine has proved to be advantageous especially if the aromatic amines employed as reactants contain groups that are sensitive to alkali, such as, for example, those of the series of fiber-reactive groups, so that it is required to carry out the condensation reaction of the phthalocyanine sulfochloride with the aromatic amine only in the slightly acid, neutral or perhaps slightly alkaline range. This requirement is present, for example, in the preparation of turquoise phthalocyanine reactive dyes which have been described, for example, in Belgian Patent Specifications Nos. 560,105, 581,441 and 611,053, in German Patent Specifications Nos. 1,179,317, 1,235,446, 1,289,218 and 1,283,997 and in U.S. Pat. Nos. 3,062,830, 3,484,450 and 4,033,980. Dyestuffs of this kind have become very important in technology.

However, the use of pyridine which is commonly employed in the technology as catalyst, involves considerable drawbacks—especially in the case of processes on an industrial scale—due to its known toxic properties and the unpleasant smell. Since the maximum admissible working place concentration for pyridine (MWC value) is only 5 ppm, additional and expensive measures are required for the technical preparation, in order not to exceed the concentration of pyridine during the preparation and optional further processing of these phthalocyanine dyestuffs in the work rooms. Besides this measure, additional technical operations, such as additional purification steps, are required, in order to prevent pyridine from remaining in the final product of the process (phthalocyanine dyestuff), all the more if the dyestuffs are obtained from the reaction mixture by spray drying, as is the common method nowadays. This is to say that even if only small portions of pyridine remain in the commercial phthalocyanine dyestuff, similar problems and drawbacks as those described above will appear when using the dyestuff, as for example in the alkaline applications as a reactive dye in dyeing-houses.

There was therefore a great need to find an improved preparation process for phthalocyanine dyestuffs which is not subject to said drawbacks.

The present invention is a process of this kind. This improved process provides the preparation of water-soluble phthalocyanine dyestuffs by reacting a phthalocyanine-sulfonic acid chloride, optionally containing a sulfo group, with a primary or secondary amine, preferably with an amine containing a benzene or naphthalene radical or preferably an amine from the aniline and naphthylamine series, which amines contain one or several, preferably one or two, β-substituted ethylsulfonyl groups of one or several, preferably one or two, vinylsulfonyl groups, and by also reacting, optionally, with a second primary or secondary amine from the aliphatic, heterocyclic or aromatic series, the improvement comprising carrying out said reaction(s) in the presence of a pyridine-sulfonic acid or a pyridine-carboxylic acid.

The present invention relates especially to an improved process for the preparation of phthalocyanine dyestuffs in the presence of a pyridine-sulfonic acid or a pyridine-carboxylic acid, in which phthalocyanine-sulfonic acid chlorides, optionally containing sulfo groups, are reacted with a primary or secondary amine, preferably from the aniline or naphthylamine series, which contains one or two, preferably one, β-hydroxyethylsulfonyl, β-chloroethylsulfonyl, β-acetoxyethylsulfonyl, β-sulfatoethylsulfonyl, β-thiosulfatoethylsulfonyl, or β-phosphatoethylsulfonyl or vinylsulfonyl groups, and optionally with a second primary or secondary amine from the aliphatic, heterocyclic or aromatic series.

The β-substituted ethylsulfonyl group(s) or vinylsulfonyl group(s) contained in the amine may be bound directly to the aromatic carbocyclic or to the aromatic heterocyclic nucleus of the amine or via a bridge member, such as a lower alkylene or an amino group optionally being substituted by lower alkyl which in its turn may be substituted, for example, by a phenyl radical, by cyano, carboxy, lower carbalkoxy, such as carbomethoxy or carbethoxy, hydroxy, lower alkanoyloxy, such as acetyloxy, or lower alkoxy, such as methoxy.

The condensation reactions of the phthalocyanine sulfochlorides with the amines are effected at a pH value of from about 4 to about 8 and additionally in the presence of an acid-binding agent, preferably from the series of the alkali metal and alkaline earth metal hydroxides and of the salts of the alkali metals and alkaline earth metals with inorganic and organic acids, which salts show a basic reaction; a pH value of about 8 is not exceeded.

The invention relates preferably to the preparation of phthalocyanine dyestuffs which in the form of the free acid have the general formula (1)

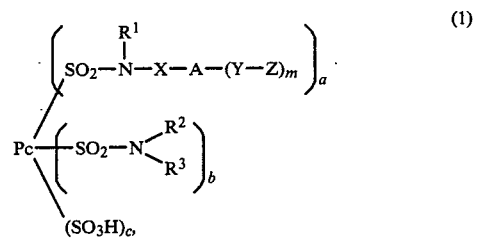

in which process a phthalocyanine-sulfonic acid chloride of the general formula (2)

is reacted in an aqueous medium, optionally with the simultaneous or subsequent partial hydrolysis of the sulfochloride groups, with an amine having the general formula (3)

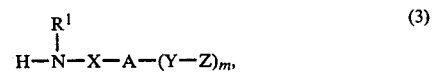

and optionally with a further amine of the general formula (4)

$$HN\begin{matrix}R^2\\R^3,\end{matrix} \quad (4)$$

simultaneously or in any order, in the presence of a pyridine sulfonic acid or a pyridine carboxylic acid. The reaction is carried out advantageously at a pH value of from about 4 to about 8 and at a temperature in the range of from about 0° C. to about 100° C., preferably from 0° C. to about 40° C., and in the presence of an acid-binding agent of the kind mentioned above.

The compounds of the formula (1) are obtained as a rule in the form of their salts, preferably in the form of the alkali metal salts, such as the sodium and potassium salts, and are used as such for the dyeing of fiber materials. In the same manner the compounds of the formula (3) are also preferably used for the reaction in the form of their salts, such as the alkali metal salts.

In the above formulae (1), (2), (3) and (4) the various symbols have the following meanings:

Pc is the radical of the metal-free or metal-containing phthalocyanine, for example of copper, cobalt or nickel phthalocyanine, said phthalocyanine radicals being unsubstituted or substituted in the 3- and/or 4-positions of the carbocyclic aromatic rings of the phthalocyanine, for example by halogen atoms, such as chlorine atoms, or aryl radicals, such as phenyl radicals, and the sulfochloride, sulfonamide and/or sulfonic acid groups are bound in the 3- and/or 4-positions of the carbocyclic aromatic rings of the phthalocyanine;

$R^1$ is a hydrogen atom or a lower aliphatic radical, especially a lower alkyl group which may be substituted;

$R^2$ and $R^3$ each represents a hydrogen atom or a lower alkyl group optionally substituted, or an aryl radical optionally substituted, $R^1$, $R^2$ and $R^3$ being identical or not all the same, or $R^2$ and $R^3$ form together with the nitrogen atom and an alkylene radical of from 3 to 8 carbon atoms, preferably 4 to 6 carbon atoms, or with a further heteroatom, such as a nitrogen atom or an oxygen atom, and two lower alkylene radicals a heterocyclic ring, such as the piperidine, the piperazine or the morpholine ring;

A is an aromatic carbocyclic or aromatic heterocyclic radical, preferably an unsubstituted or substituted phenylene or naphthylene radical, especially the phenylene or naphthylene radical, which may be substituted by 1 to 4 substituents selected from the group of lower alkyl, such as methyl and ethyl, lower alkoxy, such as methoxy and ethoxy, halogen, such as chlorine and bromine, carboxy, nitro and sulfo;

X is a covalent bond or a bivalent organic bridge member, such as a group of the formulae —⟨Ph⟩—NH—CO—,   —⟨Ph⟩—NH—CO—, —⟨Ph⟩—NH—SO$_2$—,   —⟨Ph⟩—NH—SO$_2$—, —⟨Ph⟩—SO$_2$—NH—,   —⟨Ph⟩—SO$_2$—NH—, —⟨Ph⟩—NH—CO—NH—,   —⟨Ph⟩—NH—CO—NH— or —⟨Ph⟩—NH—, preferably   —⟨Ph⟩—NH—, —(CH$_2$)$_k$—  or   —(CH$_2$)$_n$—N—
                                    |
                                    R in which
k is an integer of from 1 to 5,
n is an integer of from 2 to 6 and
R is a hydrogen atom or an alkyl group of from 1 to 5 carbon atoms, or X forms together with the group —N(R$^1$)— a radical of the formula $$-N-(CH_2)_n-N-,\quad \text{alkylene}$$

in which
n is defined as above, and
"alkylene" represents a lower alkylene radical;

Y is a direct bond or a group of the formulae

—CH$_2$—, —CH$_2$—CH$_2$—, —N— or —N—;
                              |        |
                              CH$_3$   CH$_2$—CH$_2$—CN

Z is preferably the vinylsulfonyl group, but may also be a β-substituted ethylsulfonyl group, preferably the β-hydroxyethylsulfonyl, β-chloroethylsulfonyl, β-acetoxyethylsulfonyl, β-sulfatoethylsulfonyl, β-thiosulfatoethylsulfonyl or β-phosphatoethylsulfonyl group;

a is a number of from 1 to 4;
b is a number of from zero to 3;
c is a number of from zero to 3;
a, b and c being identical or not all the same, and the sum of (a+b+c) being 4 at a maximum;
p is an integer of from zero to 3;
q is an integer of from 1 to 4,
p and q being identical or not all the same, and the sum of (p+q) being 4 at a maximum; and
m is the number 1 or 2.

The dyestuffs of the general formula (1) are as a rule obtained in the form of mixtures of the individual compounds of the formula (1), which individual compounds differ from one another by the degree of substitution of the radicals labelled by the indices a, b and c, for which reason said indices, a, b and c represent as a rule fractional numbers when establishing the formula of the product of the invention obtained (phthalocyanine dyestuff).

The term "lower" employed in the previous and the following sections means that the groups thus labelled totally or partially consist of alkyl radicals or alkylene radicals of from 1 to 4 carbon atoms. The aliphatic radicals and the aryl radicals of the formula members $R^1$, $R^2$ and $R^3$ may contain substituents as already mentioned above. In the case of the alkyl radicals, preferably the lower alkyl groups, the substituents are preferably hydroxy, sulfo, carboxy and phenyl, said alkyl radicals—if they are substituted—preferably containing 1 or 2 of these substituents. Aryl radicals are preferably phenyl radicals, especially the unsubstituted phenyl radical, or a substituted phenyl which is preferably substituted by 1 or 2 substituents selected from the group consisting or methyl, chlorine, carboxy and sulfo.

The pyridine-sulfonic acids or pyridine-carboxylic acids employed according to the invention in the condensation reactions are especially pyridine-mono-, -di- and -trisulfonic acids, pyridine-mono-, -di- and -tri-carboxylic acids and, furthermore, the derivatives thereof which are substituted in the heterocycle by non-iono-genic substituents, such as methyl- and ethyl-substituted pyridine-sulfonic acids or -carboxylic acids. Pyridine compounds of this kind are, for example, pyridine-2-sulfonic acid, pyridine-3-sulfonic acid, pyridine-4-sulfonic acid, pyridine-2-carboxylic acid, pyridine-3-carboxylic acid, pyridine-4-carboxylic acid, pyridine-2,3-dicarboxylic acid, pyridine-2,4-dicarboxylic acid, pyridine-2,5-dicarboyxlic acid, pyridine-2,6-dicarboxylic acid, pyridine-3,4-dicarboxylic acid, pyridine-3,5-dicarboxylic acid, pyridine-2,3,4-tricarboxylic acid, pyridine-2,4,5-tricarboxylic acid, 2-methylpyridine-3-sulfonic acid, 4-methylpyridine-3-carboxylic acid, 4-ethylpyridine-3-carboxylic acid, 6-methyl-pyridine-3-carboxylic acid, 4,6-dimethyl-pyridine-2-carboxylic acid, 2,6-dimethyl-pyridine-3-carboxylic acid, and 2-methyl-pyridine-3,4-dicarboxylic acid. Particularly preferred and advantageous is the use of pyridine-3-carboxylic acid (nicotinic acid) which is practically non-toxic and without smell and has proved to be excellently suitable for the purpose indicated.

The process of the invention may be modified in a way that before, during or after the actual condensation reaction(s) part of the sulfonic acid chloride groups of the starting compound of the formula (2) are converted by hydrolysis into sulfonic acid groups; thus, the condensation may be carried out, for example, by hydrolyzing part of the sulfonic acid chloride groups simultaneously with the reaction of the amine of the formula (3) or of the amines of formulae (3) and (4), or by reacting at first an amount of the amine of the formula (3) or of the amines of formulae (3) and (4) which is not sufficient for the complete reaction of all sulfonic acid chloride groups, and hydrolyzing subsequently the residual sulfonic acid chloride groups in a special reaction step in an acid to slightly alkaline medium, for example at a pH value of from 1 to 8, optionally under heat, for example at a temperature of from 20° to 50° C.

As starting compounds of the formula (2) there may used, for example, sulfonic acid chlorides or sulfo group-containing sulfonic acid chlorides of the metal-free phthalocyanine, but, preferably those of metal-containing phthylocyanines, such as di-, tri- or tetrasulfonic acid chlorides of copper phthalocyanine, of cobalt phthalocyanine or of nickel phthalocyanine, for example copper-phthalocyanine-(3)-disulfonic acid chloride, copper phthalocyanine-(3)-trisulfonic acid chloride, copper- or nickel phthalocyanine-(3)-tetrasulfonic acid chloride, cobalt phthalocyanine-(3)-trisulfonic acid chloride, copper phthalocyanine-(4)-disulfonic acid chloride or coppper phthalocyanine-(4)-tetrasulfonic acid chloride, copper phthalocyanine-(3)-disulfonic acid chloride-disulfonic acid, and copper phthalocyanine-(3)-trisulfonic acid chloride-monosulfonic acid, and, furthermore, analogous sulfonic acid chlorides which contain additionally other substituents, such as phenyl radicals and halogen atoms, at the phthalocyanine nucleus, as for example sulfonic acid chlorides of tetraphenyl-copper phthalocyanine or tetrachloro-nickel phthalocyanine. The sulfonic acid chlorides of the formula (2) are prepared according to known processes, for example in accordance with the process of German Patent No. 891,121.

Amines of the general formula (3) are, for example:

$\beta$-Hydroxyethyl-(4-amino-phenyl)-sulfone,
$\beta$-hydroxyethyl-(3-amino-phenyl)-sulfone,
$\beta$-hydroxyethyl-(3-amino-4-methoxy-phenyl)-sulfone,
$\beta$-hydroxyethyl-[4-(N-methylamino)-phenyl]-sulfone,
$\beta$-hydroxyethyl-(3-methoxy-4-amino-phenyl)-sulfone,
$\beta$-hydroxyethyl-(3-amino-4-methyl-phenyl)-sulfone,
$\beta$-hydroxyethyl-(3-amino-4-sulfo-phenyl)-sulfone,
$\beta$-hydroxyethyl-(3-bromo-4-amino-phenyl)-sulfone,
$\beta$-hydroxyethyl-(3-amino-4-carboxy-phenyl)-sulfone,
$\beta$-hydroxyethyl-(3-amino-4-hydroxy-phenyl)-sulfone,
$\beta$-hydroxyethyl-(3-hydroxy-4-amino-phenyl)-sulfone,
$\beta$-hydroxyethyl-(2,5-dimethoxy-4-amino-phenyl)-sulfone,
$\beta$-hydroxyethyl-(2-methyl-4-amino-5-methoxyphenyl)-sulfone,
$\beta$-hydroxyethyl-[4-amino-naphthyl-(1)]-sulfone,
$\beta$-hydroxyethyl-[5-amino-naphthyl-(1)]-sulfone,
$\beta$-hydroxyethyl-[6-amino-naphthyl-(2)]-sulfone,
$\beta$-hydroxyethyl-[6-amino-5-sulfonaphthyl-(2)]-sulfone,
2-amino-6,8-bis-($\beta$-hydroxyethylsulfonyl)-naphthalene,
$\beta$-hydroxyethyl-(3-amino-4-methoxy-benzyl)-sulfone,
$\beta$-hydroxyethyl-[$\beta$-(4-aminophenyl)-ethyl]-sulfone,
$\beta$-hydroxyethyl-[7-amino-naphthyl-(1)]-sulfone,
$\beta$-hydroxyethyl-[7-amino-3-sulfonaphthyl-(1)]-sulfone,
$\beta$-hydroxyethyl-[3-nitro-4-(4'-aminophenylamino)-phenyl]-sulfone,
$\beta$-hydroxyethyl-[3-(4'-aminobenzoylamino)-4-hydroxyphenyl]-sulfone,
$\beta$-hydroxyethyl-[3-(4'-aminobenzoylamino)-phenyl]-sulfone,
$\beta$-hydroxyethyl-(3-amino-4-hydroxy-5-nitro-phenyl)-sulfone,
$\beta$-hydroxyethyl-[4-(3'-aminophenylsulfonylamino)-phenyl]-sulfone,
$\beta$-hydroxyethyl-[4-($\beta$-aminoethyl)-phenyl]-sulfone,
$\beta$-hydroxyethyl-[4-(N-piperazino)-phenyl]-sulfone,
$\beta$-hydroxyethyl-[4-($\beta$-aminoethylamino)-3-nitrophenyl]-sulfone,
$\beta$-hydroxyethyl-[4-(3'-amino-4'-sulfo-phenylaminocarbonyl)-phenyl]-sulfone,
$\beta$-hydroxyethyl-[4-(4'-amino-3'-sulfo-phenylaminocarbonyl)-phenyl]-sulfone,
$\beta$-hydroxyethyl-[4-(3'-amino-4'-sulfo-phenylaminosulfonyl)-phenyl]-sulfone,
$\beta$-hydroxyethyl-[4-(3'-amino-4'-sulfo-ureido)-phenyl]-sulfone,
3-[N-($\beta$-hydroxyethylsulfonyl)-N-($\beta$-cyanoethyl)]-amino-aniline,
3-$\omega$-($\beta$-hydroxyethylsulfonyl)-methyl]-6-methoxy-aniline,
4-[N-($\beta$-hydroxyethylsulfonyl)-N-methyl]-amino-aniline,
3-$\beta$-($\beta'$-hydroxyethylsulfonyl)-ethyl-aniline, as well as the corresponding derivatives thereof, in which the $\beta$-hydroxyethyl group is replaced by a vinyl group or in which the hydroxy group of the $\beta$-hydroxyethyl radical is replaced by another substituent, preferably a substituent which can be split off by an alkali, for example by a substituent selected from the group consisting of sulfato, phosphato, thiosulfato, acetoxy and chlorine.

Amines of the formula (4) are, for example, ammonia, methylamine, ethylamine, n-butylamine, benzylamine, aniline, ethanolamine, dimethylamine, diethylamine, diisopropylamine, N-methylbenzylamine, N-methylaniline, piperidine, morpholine, diethanolamine, 2-aminoethane-1-sulfonic acid, 2-aminoethane-1-carboxylic acid, 4-amino-benzene-carboxylic acid, 3-amino-benzene-sulfonic acid or 4-amino-benzene-sulfonic acid.

Acid-binding agents of the above-mentioned kind which are used in the process of the invention are, for example, hydroxides, carbonates and hydrogenocarbonates, secondary and tertiary phosphates, borates and acetates of the metals of the first to the third group of the Periodic System, preferably the sodium and potassium compounds as well as the calcium compounds.

In order to improve the solubility of the starting and/or final products in the aqueous reaction medium, organic solvents, preferably amides of aliphatic carboxylic acids, such as dimethylformamide or N-methylpyrrolidone, may be added, if required.

The isolation of the phthalocyanine dyestuffs obtained according to the process described above is effected in usual manner by salting out, for example with sodium or potassium chloride, and/or by acidifying with a mineral acid or by evaporating the neutral or slightly acid aqueous dyestuff solutions, preferably at a moderately elevated temperature and reduced pressure.

The phthalocyanine dyestuffs which can be obtained according to the above-described process are suitable for the dyeing and printing of fiber materials made of wool, silk, linear polyamides, especially of hydroxy group-containing materials, such as cellulose, for example linen, regenerated cellulose, and above all cotton, and moreover of leather.

The dyeings are prepared in common manner, for example by direct dyeing from a dye bath which contains an agent having an alkaline effect and optionally a neutral inorganic salt, for example an alkali metal chloride or alkali metal sulfate, at room temperature or at elevated temperature, for example in the range of from about 40° to about 100° C.

Dyestuffs which show only a minor affinity to the fiber are advantageously applied by impregnating (padding) the fiber material with an aqueous solution of the dyestuff which optionally contains an agent showing an alkaline effect, and a neutral inorganic salt, in the cold or at moderate temperature, with squeezing off and by fixing the dyestuff thus applied, optionally after an intermediate drying of the impregnated material. If the padding liquor used contains an agent showing an alkaline effect, the subsequent fixation is carried out for example by steaming, thermosetting or by a short-time dwelling of the impregnated goods. The choice of the fixation process depends on the nature and the amount of the alkali used. When using impregnating baths which do not contain an agent showing an alkaline effect, the impregnated goods are subsequently introduced at first for example into a salt-containing alkali bath and are then subjected to one of the above-mentioned fixation processes.

As agents showing an alkaline effect there are preferably used alkali metal hydroxides, -carbonates, -bicarbonates, -phosphates, -borates or -silicates or alkali metal salts of trichloroacetic acid, or mixtures of the above-mentioned compounds.

In textile printing the dyestuffs are dissolved in water, optionally while adding common auxiliary agents, such as urea or a dispersing agent, and are stirred together with a thickening agent, such as methyl cellulose or an alginate thickener. To the pastes thus obtained is added an above-described agent showing an alkaline effect, and the goods are printed in common manner. The fixation is then effected according to known methods by steaming or thermosetting.

However, the fiber material may also be printed with printing pastes which have been adjusted to a neutral or slightly acid pH value and which do not contain any agents showing an alkaline effect. In this case the fiber material is treated either before or after the printing with an agent showing an alkaline effect, for example by way of a short passage through a salt-containing alkaline solution, and is subsequently subjected to one of the abovementioned fixation processes. In a very simple manner the fixation may also be effected by making the printed goods pass through a hot salt-containing alkaline solution.

The dyestuffs prepared in accordance with the invention yield on the above-mentioned fiber materials very valuable full dyeings and prints which are marked by a very good fastness to wetting and to light.

The following Examples serve to illustrate the invention. The parts are parts by weight, and the percentages are percent by weight, unless otherwise stated. The parts by weight are to the parts by volume as the kilogram is to the liter.

EXAMPLE 1

70.3 Parts of β-sulfatoethyl-(3-amino-phenyl)-sulfone and 12.4 parts of nicotinic acid are dissolved in 350 parts of water, while adding sodium bicarbonate, at a pH of 6.5. While stirring thoroughly, 97 parts of copper phthalocyanine-(3)-tetrasulfochloride are introduced in the form of a moist filter cake. The mixture is heated to 35° C., and in the course of the reaction now starting the pH value of the reaction mixture is maintained at 6.0 to 6.5 by adding about 51 parts of sodium bicarbonate. Upon completion of the reaction the dyestuff solution is filtered at 35° C. and then evaporated to dryness under reduced pressure at 60° C. 208 Parts of a salt-containing turquoise dyestuff are obtained whose structure according to the analysis corresponds approximately to the formula

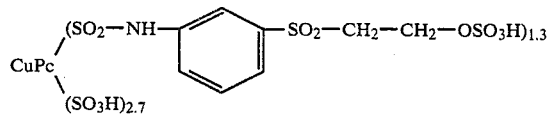

(in the form of the free acid). In the presence of an agent showing an alkaline effect, the dyestuff yields on cotton fabric bright turquoise dyeings; its properties correspond to those of the dyestuff described in German Patent Specification No. 1,179,317, Example 1.

EXAMPLE 1a

Dyestuffs having similar properties may be advantageously prepared according to the process of the invention, if the operation is carried out according to Example 1, save for using instead of the β-sulfatoethylsulfonyl compound employed in said Example an equivalent amount of one of the amines of the formula (3) with a fiber-reactive group having been mentioned in the above description.

EXAMPLE 2

While stirring thoroughly, 97 parts of copper phthalocyanine-(3)-tetrasulfonic acid chloride are introduced into a neutral solution of 84.3 parts of β-sulfato-ethyl-(4-aminophenyl)-sulfone and 12.4 parts of nicotinic acid in 400 parts of water. The mixture is heated to 35° C., and during the reaction now starting the pH value is maintained in the range of from 6.5 to 7, by adding dropwise a 20% aqueous ammonia. Upon completion of the reaction the solution obtained is filtered, and the dyestuff formed is isolated by salting out with sodium chloride and potassium chloride. For purification, the dyestuff may be dissolved again in water and salted out once more. After drying, 299 parts of a salt-containing blue dyestuff are obtained, which dyestuff resembles in all properties the product known from German Patent Specification No. 1,283,997, Example 1. It has approximately the following structure (in the form of the free acid)

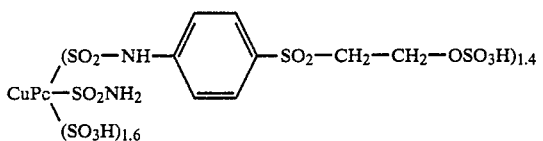

and is very well water-soluble and dyes wool and cotton in turquoise shades of very good fastness properties.

EXAMPLE 2a

Dyestuffs having similar properties may be prepared according to the process of the invention, if in the reaction to prepare same is used, instead of the copper phthalocyanine-(3)-tetrasulfonic acid chloride, an equivalent amount of nickel phthalocyanine-(3)-tetrasulfonic acid chloride or an equimolar amount of the sulfonic acid chlorides of cobalt phthalocyanine, of tetraphenyl-copper phthalocyanine or of the metal-free phthalocyanine, whose preparation has been described in German Patent Specification No. 891,121.

EXAMPLE 3

12.8 Parts of a 20% aqueous ammonia are slowly added dropwise to a suspension of 97 parts of copper phthalocyanine-(3)-tetrasulfonic acid chloride in 300 parts of water, the suspension being maintained at a neutral pH by adding dilute sodium hydroxide solution. Said mixture is stirred at 20° C., until it shows again a neutral reaction, whereupon a neutral solution of 56.2 parts of β-sulfatoethyl-(4-aminophenyl)-sulfone and 12.3 parts of nicotinic acid in 250 parts of water is added. Stirring is continued at 20° C., in which process a pH value of from 6.5 to 7 is maintained by adding portionwise 38 parts of sodium bicarbonate. As soon as the reaction is completed and no bicarbonate is consumed any longer, the solution obtained is filtered, and the dyestuff having been formed is isolated by salting out with sodium chloride and potassium chloride. After drying, 190 parts of a blue powder are obtained which is dissolved in water with a turquoise shade.

The dyestuff corresponds in its properties to the product known from German Patent Specification No. 1,293,997, Example 2, and shows the structure of the dyestuff prepared in the above Example 2. Under the action of an agent showing an alkaline effect it is fixed on cotton and yields turquoise dyeings and prints of a good fastness to washing and to light.

EXAMPLE 3a

If the process is carried out in the manner described in Example 3, however, while using instead of ammonia an equivalent amount of one of the following amines, there are obtained according to the invention also dyestuffs having similarly favorable dyeing properties: Methylamine, ethylamine, n-butylamine, benzylamine, aniline, ethanolamine, dimethylamine, diethylamine, diisopropylamine, N-methylbenzylamine, N-methylaniline, piperidine, morpholine, diethanolamine, 2-aminoethane-1-carboxylic acid, 2-amino-ethane-1-sulfonic acid, 4-aminobenzene-carboxylic acid, 3-aminobenzene-sulfonic acid or 4-aminobenzene-sulfonic acid.

EXAMPLE 4

To a neutral solution of 87 parts of β-sulfatoethyl(4-aminophenyl)-sulfone in 400 parts of water are added 70 parts of sodium bicarbonate, and thereafter 97 parts of nickel phthalocyanine-(3)-tetrasulfochloride in the form of a moist filter cake are introduced, while stirring thoroughly. A solution of 12.3 parts of nicotinic acid in 50 parts by volume of 2 N sodium hydroxide solution is added, and the reaction mixture is stirred at room temperature. Said mixture is subsequently heated for another hour at 50° C., the solution obtained is clarified by suction filtration, and the product is salted out with potassium chloride. After drying, 130 parts of a greenish blue powder are obtained. The dyestuff is easily soluble in water and is fixed on native or regenerated cotton fibers with alkalis with favorable fastness properties with regard to washing and light. It corresponds to the dyestuff known from German Patent Specification No. 1,179,317, Example 6, having the same properties; in accordance with the analysis it shows approximately the following structure (set forth in the form of the free acid):

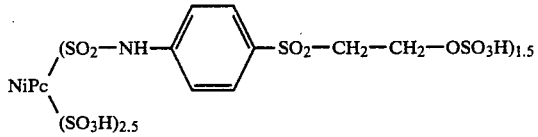

EXAMPLE 4a

If the process is carried out as has been described in Example 4, save for using instead of the nicotinic acid an equivalent amount of one of the pyridine-sulfonic acids or -carboxylic acids specified in detail in the above description, the reaction proceeds according to the process of the invention in the same manner and leads to the same dyestuff product.

EXAMPLE 5

112 Parts of the phosphoric acid-monoester of β-hydroxyethyl-(4-aminophenyl)-sulfone are dissolved in 500 parts of water by carefully adding 200 parts by volume of 2 N sodium hydroxide solution. At 20° C., 194 parts of copper phthalocyanine-(3)-tetrasulfonic acid chloride in the form of a moist filter cake are introduced into the solution obtained, while stirring thoroughly. Subsequently the solution of 24.6 parts of nicotinic acid in 100 parts by volume of 2 N sodium hydroxide solution is added, and in the course of the reaction now starting the pH value of the reaction mixture is maintained at 6.5 by adding about 90 parts of sodium bicarbonate. Upon completion of the reaction the dyestuff solution obtained is adjusted with hydrochloric acid to a pH value of 2, and the dyestuff is separated by salting out with sodium chloride and potassium chloride, filtered off and washed with sodium chloride solution. After drying, 440 parts of a salt-containing turquoise dyestuff are obtained, whose structure according to the analysis corresponds approximately to the formula

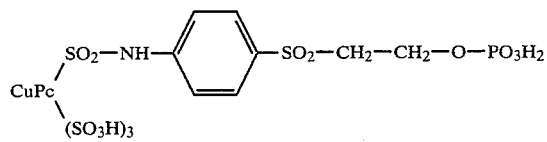

(in the form of the free acid). The dyestuff yields on cotton fabric in the presence of agents having an alkaline effect bright turquoise dyeings showing good fastness properties with regard to washing, rubbing and light. It corresponds in its properties to the dyestuff known from U.S. Pat. No. 4,033,980, Example 1.

EXAMPLE 6

To a neutral solution of 92 parts of β-thiosulfatoethyl-(4-aminophenyl)-sulfone in 400 parts of water are added 70 parts of sodium bicarbonate, and subsequently 97 parts of nickel phthalocyanine-(3)-tetrasulfochloride in the form of a moist filter cake are introduced, while stirring thoroughly. A solution of 12.3 parts of nicotinic acid in 50 parts by volume of 2 N sodium hydroxide solution is added, and the reaction mixture is stirred at 30° C., until the components have completely dissolved.

Subsequently the mixture is heated for another hour at 50° C., the solution obtained is clarified by suction filtration, and the product is salted out with potassium chloride. After drying, 135 parts of a greenish blue powder are obtained. The dyestuff is easily soluble in water and is fixed on native or regenerated cotton fibers with alkalis with favorable fastness properties with regard to washing and light. According to the analysis it shows approximately the following structure (in the form of the free acid):

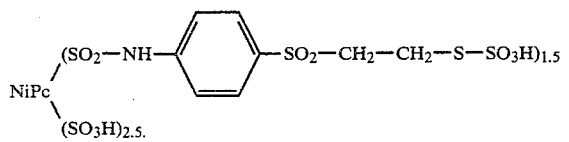

EXAMPLE 6a

If the process is carried out as has been described in Example 6, save for using instead of the nicotinic acid an equivalent amount of one of the pyridine-sulfonic acids or -carboxylic acids specified in detail in the above description, the reaction proceeds according to the process of the invention in the same manner, while leading to the same dyestuff product.

EXAMPLE 7

125 Parts of β-sulfatoethyl-[3-(4'-aminobenzoylamino)4-hydroxyphenyl]-sulfone and 12.4 parts of nicotinic acid are dissolved in 350 parts of water, while adding sodium bicarbonate, at a pH value of 6.5. While stirring thoroughly, 97 parts of copper phthalocyanine-(3)-tetrasulfochloride are introduced in the form of a moist filter cake. The mixture is heated to 35° C., and in the course of the reaction now starting the pH value of the reaction mixture is maintained at 6.0 to 6.5 by adding about 51 parts of sodium bicarbonate. Upon completion of the reaction the dyestuff solution is filtered at 35° C. and thereafter evaporated to dryness under reduced pressure at 60° C. 263 Parts of a saltcontaining turquoise dyestuff are obtained, whose structure according to the analysis corresponds approximately to the formula

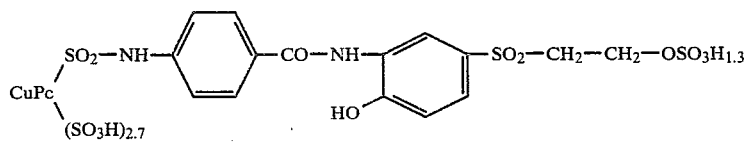

(in the form of the free acid). The dyestuff yields on cotton fabric in the presence of an agent showing an alkaline effect bright turquoise dyeings; as for its properties, it corresponds to the dyestuff described in German Patent Specification No. 1,179,317, Example 8.

EXAMPLE 7a

Dyestuffs showing similar properties may be advantageously prepared according to the process of the invention, if the operation is carried out according to Example 7, save for using instead of the β-sulfatoethylsulfonyl compound employed in said Example an equivalent amount of, for example, one of the following amines of the general formula (3) with a fiber-reactive group:
4-Amino-2'-nitro-4'-(β-sulfatoethylsulfonyl)-diphenylamine,
4-aminobenzene-(3'-β-sulfatoethylsulfonyl)-carboxylic acid anilide,
3-aminobenzene-(4'-β-sulfatoethylsulfonyl)-sulfonic acid anilide,
1-amino-2-(4'-β-sulfatoethylsulfonyl-phenyl)-ethane,
4-(β-sulfatoethylsulfonyl)-benzylamine,
N-(4'-β-sulfatoethylsulfonyl-phenyl)-piperazine,
2-nitro-4-β-sulfatoethylsulfonyl-N-(β'-aminoethyl)-aniline,
4-[4'-(β-chloroethylsulfonyl)-benzoylamino]-2-aminobenzene-sulfonic acid,
3-[4'-(β-acetoxyethylsulfonyl)-benzoylamino]-6-aminobenzene-sulfonic acid,
4-[4'-(β-sulfatoethylsulfonyl)-phenylsulfonylamino]-2-amino-benzene-sulfonic acid,
N-(3-amino-4-sulfo-phenyl)-N'-(4'-β'-sulfatoethylsulfonylphenyl)-urea,
2-methoxy-5-ω-(β-sulfatoethylsulfonyl)-methyl-aniline,
2-amino-4,8-di-(β-hydroxyethylsulfonyl)-naphthalene,
4-[β-(β'-sulfatoethylsulfonyl)]-ethyl-aniline.

EXAMPLE 8

97 Parts of copper phthalocyanine-(3)-tetrasulfonic acid chloride are introduced, while stirring thoroughly, into a neutral solution of 105 parts of 3-[N-(β-sulfatoethylsulfonyl)-N-(β-cyanoethyl)]-amino-aniline and 12.4 parts of nicotinic acid in 400 parts of water. The mixture is heated to 35° C., and during the reaction now starting the pH value is maintained in the range of from 6.5 to 7 by adding dropwise 20% aqueous ammonia. Upon completion of the reaction the solution obtained is filtered, and the dyestuff formed is isolated by salting out with sodium chloride and potassium chloride. For purification, the dyestuff may be dissolved again in water and salted out once more. After drying, 299 parts of a salt-containing blue dyestuff are obtained which resembles in all properties the product known from German Patent Specification No. 1,283,997, Example 5. It shows portionwise 38 parts of sodium bicarbonate. As soon as the reaction is completed and no bicarbonate is consumed any longer, the solution obtained is filtered, and the dyestuff formed is isolated by salting out with sodium chloride and potassium chloride. After drying, 220 parts of a blue powder are obtained which is dissolved in water with a turquoise shade.

The dyestuff corresponds in its properties to the product known from German Patent Specification No. 1,283,997, Example 2, last Example of the Table, and shows approximately the following structure (in the form of the free acid)

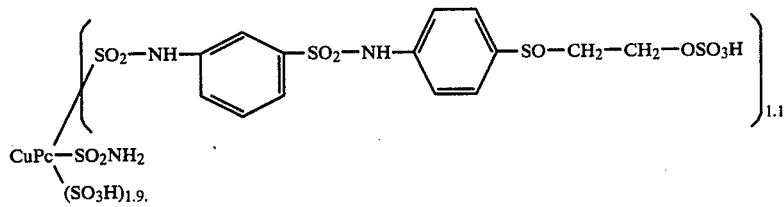

approximately the following structure (in the form of the free acid)

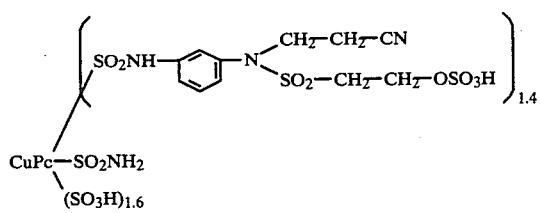

and is very well water-soluble and dyes wool and cotton in turquoise shades of very good fastness properties.

EXAMPLE 8a

Dyestuffs having similar properties may be prepared according to the process of the invention, if in the reaction described in Example 8 there is used instead of the copper phthalocyanine-(3)-tetrasulfonic acid chloride an equivalent amount of nickel phthalocyanine-(3)-tetrasulfonic acid chloride or an equimolar amount of a sulfonic acid chloride of cobalt phthalocyanine, of tetraphenyl-copper phthalocyanine or of the metal-free phthalocyanine, whose preparation has been described in German Patent Specification No. 891,121.

EXAMPLE 9

12.8 Parts of 20% aqueous ammonia are slowly added dropwise to a suspension of 97 parts of copper phthalocyanine-(3)-tetrasulfonic acid chloride in 300 parts of water, the suspension having been adjusted to a neutral pH value by adding dilute aqueous sodium hydroxide solution. Said mixture is stirred at 20° C. until it shows again a neutral reaction, whereupon a neutral solution of 87.2 parts of β-sulfatoethyl-[4-(3'-aminophenyl-sulfonylamino)-phenyl]-sulfone and of 12.3 parts of nicotinic acid in 250 parts of water is added. Subsequently stirring is continued at 35° C., the pH value being maintained in the range of from 6.5 to 7 by adding Under the action of an agent having an alkaline effect it is fixed on cotton and yields turquoise dyeings and prints of a good fastness to washing and light.

EXAMPLE 9a

If the process is carried out as has been described in Example 9, save for using instead of ammonia an equivalent amount of one of the following amines, dyestuffs are also obtained according to the process of the invention which show similarly favorable dyeing properties: Methylamine, ethylamine, n-butylamine, benzylamine, aniline, ethanolamine, dimethylamine, diethylamine, di-isopropylamine, N-methyl-benzylamine, N-methylaniline, piperidine, morpholine, diethanolamine, 2-aminoethane-1-carboxylic acid, 2-aminoethane-1-sulfonic acid, 4-aminobenzene-carboxylic acid, 3aminobenzene-sulfonic acid and 4-aminobenzene-sulfonic acid.

EXAMPLE 10

70 Parts of sodium bicarbonate are added to a neutral solution of 104 parts of β-thiosulfatoethyl-[4-(4'-aminobenzoylamino)-phenyl]-sulfone in 400 parts of water, whereupon 97 parts of nickel phthalocyanine-(3)-tetrasulfochloride are introduced in the form of a moist filter cake, while stirring well. A solution of 12.3 parts of nicotinic acid in 50 parts by volume of an aqueous 2 N sodium hydroxide solution is added, and the reaction mixture is stirred at 30° C., until all the components have dissolved.

Subsequently the mixture is heated for another hour at 50° C., the solution obtained is clarified by suction filtration, and the product is salted out with potassium chloride. After drying, 150 parts of a greenish blue powder are obtained. The dyestuff is easily soluble in water and is fixed on native or regenerated cotton fibers with alkalis with favorable fastness properties with regard to washing and light. According to the analysis it shows approximately the following structure (in the form of the free acid):

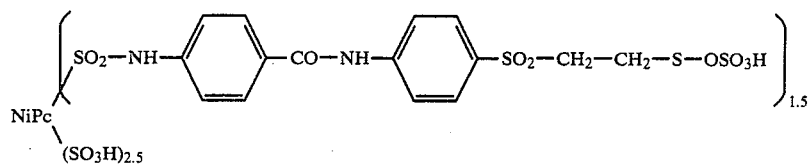

EXAMPLE 10a

If the process is carried out as has been described in Example 10, save for using instead of the nicotinic acid an equivalent amount of one of the pyridinesulfonic acids or -carboxylic acids specified in detail in the above description, the reaction proceeds according to the process of the invention in the same manner, while leading to the same dyestuff product.

EXAMPLE 11

160 Parts of the phosphoric acid-monester of β-hydroxyethyl-[3-(4'-amino-benzolyamino)-phenyl]-sulfone are dissolved in 500 parts of water by carefully adding 200 parts by volume of an aqueous 2 N sodium hydroxide solution. At 20° C., 194 parts of copper phthalocyanine-(3)-tetrasulfonic acid chloride in the form of a moist filter cake are introduced into the solution obtained, while stirring thoroughly. Thereafter the solution of 24.6 parts of nicotinic acid in 100 parts by volume of 2 N sodium hydroxide solution is added, and in the course of the reaction now starting the pH value of the reaction mixture is maintained at 6.5 by adding about 90 parts of sodium bicarbonate. Upon completion of the reaction the dyestuff solution obtained is adjusted to a pH value of 2 with hydrochloric acid and, the dyestuff is separated by salting out with sodium chloride and potassium chloride, filtered off and washed with sodium chloride solution. After drying, 440 parts of a salt-containing turquoise dyestuff are obtained whose structure according to the analysis corresponds approximately to the formula

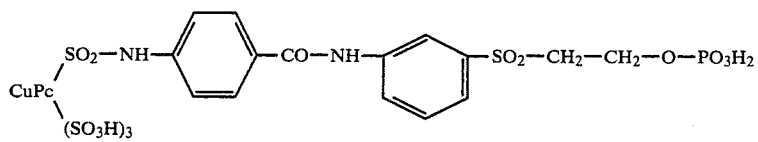

(in the form of the free acid). Said dyestuff yields on cotton fabric in the presence of an agent showing an alkaline effect bright turquoise dyeings of favorable fastness properties with regard to washing, rubbing and light. It corresponds to the dyestuff known from U.S. Pat. No. 4,033,980, Example 1.

EXAMPLE 12

104.5 Parts of 3-[N-(β-cyanoethyl)-N-ethionyl]-amino-1-aminobenzene and 12.3 parts of nicotinic acid are dissolved in 1000 parts of water, while adding 33.5 parts of sodium hydrogenocarbonate, until the reaction is neutral. 97 Parts of copper phthalocyanine-(3)-tetrasulfochloride in the form of a moist filter cake are introduced into the solution obtained, and the mixture is stirred at 30° to 35° C. By a continuous addition of sodium hydrogenocarbonate the pH value is maintained at 6.5 to 7.0. As soon as the reaction is completed, the dyestuff formed is isolated by salting out with sodium chloride. After drying, 235 parts of a salt-containing blue dyestuff are obtained which (in the form of the free acid) shows the following structure:

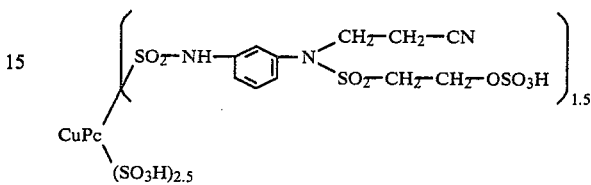

The dyestuff is easily soluble in water and dyes cotton in the presence of an agent showing an alkaline effect in turquoise shades of very good fastness properties. It corresponds to the dyestuff known from German Patent Specification No. 1,289,218, Example 1.

EXAMPLE 13

105 Parts of the potassium salt of 4-(N-methyl-N-ethionylamino)-1-aminobenzene are dissolved in 1200 parts of water. To this solution are added, while stirring thoroughly, 97 parts of copper phthalocyanine-(3)-tetrasulfochloride in the form of a moist filter cake and subsequently a solution of 6.2 parts of nicotinic acid in 50 parts by volume of an aqueous 1 N sodium hydroxide solution. The pH value of the reaction mixture is adjusted to 6.5 to 7.0 by adding sodium carbonate, then the mixture is heated to 35° C., and during the reaction now starting the pH value is maintained at 6.5 to 7.0 with sodium carbonate. As soon as the reaction is completed and all the components have dissolved, the dyestuff formed is salted out with sodium chloride, filtered off and dried. 227 Parts of a salt-containing blue dyestuff are obtained which shows approximately the following structure (in the form of the free acid)

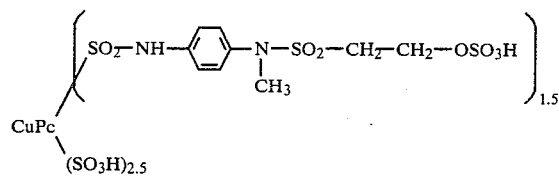

The dyestuff has the same properties as the one known from German Patent Specification No. 1,235,466, Example 3, and yields on cotton in the presence of an agent showing an alkaline effect turquoise dyeings and prints of good fastness properties.

EXAMPLE 14

53 Parts of the hydrochloride of β-hydroxyethyl-4-(β-amino-ethyl)-phenylsulfone, 6.2 parts of nicotininc acid and 97 parts of copper phthalocyanine-(3)-tetrasulfochloride (in the form of a moist filter cake) are stirred with 500 parts of water. The pH value of the reaction mixture is then adjusted to 9.5 by adding an aqueous 16.5% sodium hydroxide solution and, thereafter the mixture is heated to 50° C., while maintaining the pH value at 9.5 during the reaction now starting by the dropwise addition of a further amount of the above sodium hydroxide solution. After a few hours the reaction is completed, and the dyestuff having been formed is isolated by salting out. After drying, 238 parts of a salt-containing dark blue powder are obtained. The dyestuff shows the following structure (in the form of the free acid)

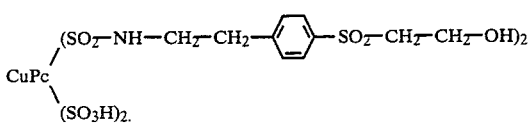

It yields on cotton fabric under the action of a sodium hydroxide solution a blue dyeing which is fixed by the action of heat with favorable fastness properties with regard to washing.

EXAMPLE 14a

A dyestuff having similar properties may advantageously be prepared according to the process of the invention, if the operation is carried out in accordance with Example 14, save for using instead of the β-hydroxyethyl-4-(β-aminoethyl)-phenylsulfone employed in said Example an equivalent amount of β-hydroxyethyl-4-aminomethyl-phenylsulfone.

EXAMPLE 15

62 Parts of β-sulfatoethyl-4-(β'-aminoethyl)-phenylsulfone, 6.2 parts of nicotinic acid and 97 parts of copper phthalocyanine-(3)-tetrasulfochloride (in the form of a moist filter cake) are stirred with 400 parts of water. The pH value of the reaction mixture is adjusted to 6.5 by adding sodium hydrogenocarbonate, and thereafter the mixture is heated to 45° C., while maintaining the pH value at 6.5 during the reaction now starting by a further addition of sodium hydrogenocarbonate; in this process about 80 parts of sodium hydrogenocarbonate are consumed. Upon completion of the reaction, a deep blue solution has formed. The dyestuff having been produced is isolated by evaporating this solution under reduced pressure. 196 Parts of a salt-containing dyestuff are obtained which in the form of the free acid shows the following structure:

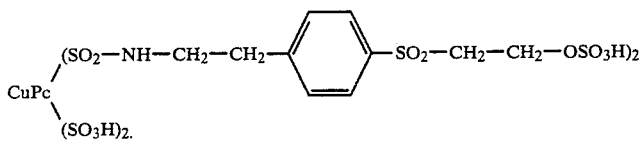

With this dyestuff and in the presence of agents showing an alkaline effect, turquoise dyeings and prints of very good fastness properties are obtained on cotton fabric.

EXAMPLE 15a

Green dyestuffs having similar dyeing properties may advantageously be prepared according to the process of the invention if the operation is carried out in accordance with Example 15, save for using instead of the β-sulfatoethyl-4-(β'-amino-ethyl)-phenylsulfone an equivalent amount of β-sulfato-ethyl-[3-nitro-4-(β-aminoethyl-amino)-phenyl]-sulfone or of β-sulfatoethyl-[3-nitro-4-(4'-aminophenylamino)-phenyl]-sulfone.

What is claimed is:

1. In a process for the preparation of a water-soluble phthalocyanine dyestuff by reacting a phthalocyanine-sulfonic acid chloride or a phthalocyanine-sulfonic acid chloride containing sulfo groups, with a primary or secondary amine which contains one or several β-substituted ethylsulfonyl groups or one or several vinylsulfonyl groups, or with said amine and also a second primary or secondary amine of the aliphatic, heterocyclic or aromatic series, the improvement which comprises so reacting in the presence of a pyridine-sulfonic acid or a pyridine-carboxylic acid compound.

2. A process as defined in claim 1, which further comprises partially hydrolyzing sulfochloride groups of the phthalocyanine-sulfonic acid chloride or of phthalocyanine-sulfonic acid chloride containing sulfo groups or of the reaction product with the former or both of said amines to yield sulfo groups.

3. A process as defined in claim 1 for the preparation of a phthalocyanine dyestuff which in the form of the free acid has the formula

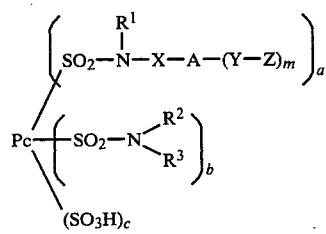

by reacting a phthalocyanine-sulfonic acid chloride of the formula

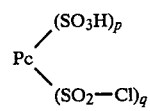

in an aqueous medium with an amine of the formula

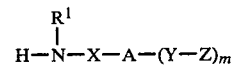

or with said amine and also a second amine of the formula

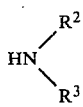

simultaneously or in any order, wherein in the formulae
Pc is the radical of the metal-free phthalocyanine or of a copper, cobalt or nickel phthalocyanine, said phthalocyanine being unsubstituted or substituted in the 3- or 4-position, or both, of the carbocyclic aromatic rings thereof by halogen or phenyl, and each sulfochloride, sulfonamide and/or sulfonic acid group is bound in either of the 3- or 4-position of a carbocyclic aromatic ring of the phthalocyanine;

$R^1$ is hydrogen, a lower alkyl group or a substituted lower alkyl group;

$R^2$ and $R^3$ each is hydrogen, lower alkyl, substituted lower alkyl, aryl or substituted aryl, $R^1$, $R^2$ and $R^3$ being the same or not all the same, or $R^2$ and $R^3$ form together with the nitrogen atom and an alkylene of from 3 to 8 carbon atoms, or additionally with a further nitrogen or oxygen and two lower alkylenes, a heterocyclic ring;

A is phenylene or naphthylene unsubstituted or substituted by 1 to 4 substituents selected from the group consisting of lower alkyl, lower alkoxy, halogen, carboxy, nitro and sulfo;

X is a direct bond or one of the groups

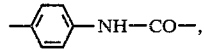 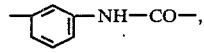

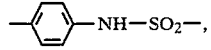 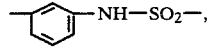

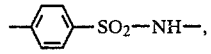 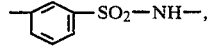

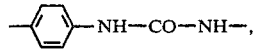 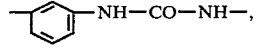

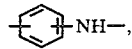

$-(CH_2)_k-$ or 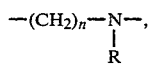

in which
k is an integer of from 1 to 5,
n is an integer of from 2 to 6 and
R is hydrogen or alkyl of from 1 to 5 carbon atoms, or X forms together with $-N(R^1)-$ a group of the formula

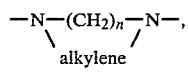

in which
n is as defined above, and the alkylene is lower alkylene;
Y is a direct bond or one of the groups $-CH_2-, -CH_2-CH_2-, -\underset{\underset{CH_3}{|}}{N}- \text{ or } -\underset{\underset{CH_2-CH_2-CN}{|}}{N}-;$ Z is β-hydroxyethylsulfonyl, β-chloroethylsulfonyl, β-acetoxyethylsulfonyl, β-sulfatoethylsulfonyl, β-thiosulfatoethylsulfonyl, β-phosphatoethylsulfonyl or vinylsulfonyl;
a is a number of from 1 to 4;
b is a number of from zero to 3;
c is a number of from zero to 3;
a, b and c being the same or not all the same, and the sum of a, b and c being 4 at a maximum;
p is an integer of from zero to 3;
q is an integer of from 1 to 4,
p and q being identical or different from each other, and the sum of p and q being 4 at a maximum; and
m is 1 or 2.

4. A process as defined in claim 3, which comprises partially hydrolyzing sulfochloride groups of the phthalocyaninesulfonic acid chloride or of the reaction product with the former or both of said amines.

5. A process as defined in claim 3 for the preparation of a phthalocyanine dyestuff which in the form of the free acid has the formula

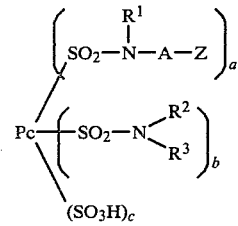

wherein a phthalocyanine-sulfonic acid chloride of the formula

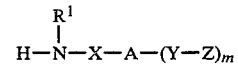

is reacted in an aqueous medium with an amine of the formula

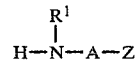

and with a further amine or the formula

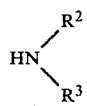

simultaneously or in any order.

6. A process as defined in claim 5, which further comprises partially hydrolyzing sulfochloride groups of the phthalocyanine-sulfonic acid chloride or of the reaction product with said amines.

7. A process as defined in claim 3 or 4, wherein $R^1$ is hydrogen or alkyl of from 1 to 4 carbon atoms unsubstituted or substituted by substituents selected from the group consisting of hydroxy, sulfo, carboxy and phenyl, and $R^2$ and $R^3$ are the same or different and each is hydrogen or alkyl of from 1 to 4 carbon atoms unsubstituted or substituted by substituents selected from the group consisting of hydroxy, sulfo, carboxy and phenyl, or each is phenyl unsubstituted or substituted by one or two substituents selected from the group consisting of chlorine, methyl, carboxy and sulfo, or $R^2$ and $R^3$ together with the nitrogen atom are piperidino, piperazino or morpholino.

8. A process as defined in claim 5 or 6, in which $R^1$ is hydrogen or alkyl of from 1 to 4 carbon atoms unsubstituted or substituted by substituents selected from the group consisting of hydroxy, sulfo, carboxy and phenyl, and $R^2$ and $R^3$ are the same or different and each is hydrogen or alkyl of from 1 to 4 carbom atoms unsubstituted or substituted by substituents selected from the group consisting of hydroxy, sulfo, carboxy and phenyl, or each is phenyl unsubstituted or substituted by one or two substituents selected from the group consisting of chlorine, methyl, carboxy and sulfo, or $R^2$ and $R^3$ together with the nitrogen atom are piperidino, piperazino or morpholino.

9. A process as defined in claim 1, wherein the pyridinecarboxylic acid is a pyridine-mono-carboxylic acid.

10. A process as defined in claim 7 wherein the pyridinecarboxylic acid is nicotinic acid.

11. A process as defined in claim 1 or 2, wherein Z is β-sulfatoethylsulfonyl, β-thiosulfatoethylsulfonyl, β-phosphatoethylsulfonyl, β-acetoxyethylsulfonyl, β-chloroethylsulfonyl, β-hydroxyethylsulfonyl or vinylsulfonyl.

12. A process according to claim 4 or 6, which comprises using a phthalocyanine-sulfonic acid chloride of the formula

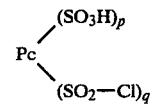

wherein p is zero.

* * * * *